(12) United States Patent
Cedrone et al.

(10) Patent No.: US 6,538,987 B1
(45) Date of Patent: Mar. 25, 2003

(54) RAPID RING PROTECTION SWITCHING SYSTEM

(75) Inventors: Dan Cedrone, Groton, MA (US); Walter Dray, Carlisle, MA (US); Ed Klein, Holliston, MA (US); James Regan, Waltham, MA (US); Bappa Sinha, Brighton, MA (US); Ming-Teh Ma, Newton, MA (US); Jeffrey Weiss, Lincoln, RI (US)

(73) Assignee: Ciena Corporation, Linthicum, MD (US)

( * ) Notice: Subject to any disclaimer, the term of this patent is extended or adjusted under 35 U.S.C. 154(b) by 0 days.

(21) Appl. No.: 09/275,829

(22) Filed: Mar. 25, 1999

(51) Int. Cl.$^7$ .............................................. G01R 31/08
(52) U.S. Cl. ...................... 370/216; 370/222; 370/223; 370/241.1
(58) Field of Search ................................ 370/216, 217, 370/218, 222–223, 224, 225, 227, 389, 397, 241.1

(56) References Cited

U.S. PATENT DOCUMENTS 5,636,215 A * 6/1997 Kubo et al. ................. 370/397
6,272,107 B1 * 8/2001 Rochberger et al. ........ 370/216

* cited by examiner

*Primary Examiner*—Wellington Chin
*Assistant Examiner*—Maikhanh Tran
(74) *Attorney, Agent, or Firm*—Patricia A. Sheehan; David L. Soltz (57) ABSTRACT

A system with predefined primary and secondary routes sets up corresponding virtual circuits over both routes. A destination node maintains primary and secondary sets of routing tables that contain, respectively, routing information over each of the rings for every virtual circuit. A destination node disables the appropriate entries in the routing tables for the non-selected route, such that the node ultimately discards the traffic received over that route. To switch a virtual path, and thus all of the virtual circuits included therein, from the selected route to the nonselected route, the destination node disables and enables the appropriate entries in the primary and the secondary routing tables, to switch from using the set-up virtual circuits on the selected route to using the set-up virtual circuits on the non-selected route. To detect an event that triggers protection switching, such as path failure, the system uses "Continuity OAM cells" to provide path status information to the nodes. A source node periodically originates Continuity OAM cells over the primary and the secondary routes. A node that receives a Continuity OAM cell multicasts the cell to (a) the processor on the node and (b) without alteration to successive nodes on the same ring. If the node processor determines that the node has not received a predetermined number of Continuity OAM cells from the source node over the selected route within a selected number of time windows, the node determines that there is a path failure on the selected route. The affected destination node then triggers protection switching if, in the same windows, the node receives an appropriate number of Continuity OAM cells from the source node over the non-selected route. To facilitate detection of path degradation, the source nodes include error counts for the associated ring interface in the Continuity OAM cells. A destination node detects path degradation when the accumulated error rate over a selected route from a source node exceeds a predetermined maximum. The destination node then triggers protection switching if the accumulated error rate over the non-selected route is better than that over the selected route by a predetermined margin.

13 Claims, 6 Drawing Sheets

RAPID RING PROTECTION SWITCHING SYSTEM

BACKGROUND OF THE INVENTION

One of the advantages of a ring-based network is that the traffic between two nodes on the ring can be re-routed over a predetermined secondary route, if a failure should occur in a primary route. An example of such a network is a SONET ring, with predefined primary and secondary, or working and protection, routes between the nodes on the ring. The routes may be over redundant rings, which pass traffic simultaneously in opposite directions. Such a system is commonly referred to as a "unidirectional ring."

When a failure or a significant degradation in, for example, the primary route, is detected on a SONET ring, the system must automatically re-route, or switch, affected traffic from the primary route to the secondary route. The re-routing, which is commonly referred to as "protection switching," is performed in unidirectional systems by the destination nodes, that is, by the nodes that terminate the traffic or route the traffic off of the ring to a user or another network. In the example, the destination nodes switch from receiving the affected traffic over the primary route to receiving the traffic over the secondary route. The specifications for many SONET ring based networks require that protection switching be accomplished in 50 msec or less.

Recently, SONET rings have been incorporated into ATM systems. In these systems, ATM cells and frames are routed over the ring in virtual circuits. The virtual circuits that span the same nodes are bundled into virtual paths, and the rings are thus referred to as "virtual path rings." The virtual paths in these virtual path rings are pre-established, in the sense that each virtual path is assigned a fixed amount of the ring bandwidth based, for example, on the service contracts of the associated users. A virtual circuit is included in a virtual path by allocating to it a fixed portion of the path bandwidth. If there is not enough available bandwidth within the virtual path for the virtual circuit, the system refrains from setting up the circuit, even if there is bandwidth otherwise available on the ring. Accordingly, the virtual path rings may not be able to accommodate bursty traffic, such as the traffic from a local area network, or "LAN." For a more detailed explanation, refer to Bellcore Standard GR-2837.

In known prior systems, the virtual circuits are set up over the selected ring, which in the example is the primary ring. Each destination node includes a primary ring interface that is configured to forward the cells received over the virtual circuits to destination ports in accordance with stored routing information. The destination node discards the corresponding traffic received over the non-selected ring, since the virtual circuits are not terminated on the interface associated with that ring.

Intermediate nodes manage traffic on a virtual path basis, without reference to virtual circuit routing information. The intermediate nodes thus pass the virtual path traffic received on the primary ring to successive nodes on the primary ring and the virtual path traffic received on the secondary ring to successive nodes on the secondary ring, regardless of which ring is ultimately chosen as the selected route by the destination node.

A decision to perform protection switching on the virtual path ring is made on the basis of the virtual paths, and necessarily affects all of the virtual circuits included in the switched virtual paths. The destination nodes implement the switch by individually tearing down the hundreds or thousands of affected virtual circuits set-up on the interface to the previously selected route, and setting up new virtual circuits on the interface to the previously non-selected route. If the SONET ring is not unidirectional, the source nodes must also switch from sending the affected virtual circuit traffic over the previously selected ring to sending the traffic over the previously non-selected ring. The source nodes must thus similarly tear down the hundreds or thousands of virtual circuits from one ring interface and set up new ones on the interface to the other ring.

If the number of affected virtual circuits is relatively large, a given destination node may not satisfy the 50 msec time limit for protection switching. The protection switching time limit may thus limit the number of virtual circuits that can be included in a given virtual path. What is needed is a mechanism that rapidly performs protection switching regardless of the number of affected virtual circuits.

There are essentially two events that trigger protection switching, namely, the failure of a selected path or the degradation of the path. When the path fails, traffic is no longer provided to the destination node over the path. When the path is degraded, the traffic over the path becomes corrupted.

The SONET ring specifications require that intermediate nodes detect a path failure by determining when a node interface on the path is no longer operational. See, Bellcore Standard GR-2980. The intermediate nodes then send appropriate OAM cells to the affected destination nodes, to notify them of the path failure. If the ring is not unidirectional, the intermediate nodes also send OAM cells to the affected source nodes. In response to the OAM cells, the affected destination nodes and, as appropriate, the source nodes, perform protection switching.

The failure detection mechanism works well when the path failure is caused by a failure in the transmission medium, such as a broken cable. It does not, however, work well when the path failure is the result of a node no longer forwarding certain cells over the selected ring because of, for example, an erroneous routing table configuration or a hardware problem. The failure to forward the cells must instead be detected by the intended destination node, when it no longer receives cells. Such failures are not readily detected in traffic that is bursty, such as LAN traffic, because the time intervals between the cells vary in length. Accordingly, there may be a relatively long delay, and thus, a loss of cells, before the destination node detects the path failure. What is needed is a mechanism for the nodes to detect path failure without significant delay, even in bursty traffic.

The SONET ring specifications also require that nodes notify "upstream" nodes of degradation in the path, that is, degradation in the transmission facilities on the path. See, Bellcore Standard GR-2980. The specifications do not, however, state how the nodes determine that a path has become sufficiently degraded, that is, how the nodes determine an accumulated error rate for the path.

Errors in the cell body are detected when the cell is processed at the destination node in an ATM segmentation and reassembly layer, which is removed from the SONET transport layer at which the protection switching decisions are made. There is thus a delay in providing error information from the ATM segmentation layer to the SONET transport layer. Also, cells with damaged headers are discarded along the route and the destination nodes are not typically notified of this type of error.

A system may use OAM cells for monitoring virtual path performance, as set forth in ITUI.610(3/93)B-ISDN Operations and Principles. The performance monitoring OAM cells are injected at periodic intervals into the cell streams on the virtual paths. Each performance monitoring OAM cell includes a count of the cells transmitted after the transmission of the previous associated performance monitoring OAM cell, and summary cell parity information for the counted cells. The count and parity information in the performance monitoring OAM cells are used to determine the number of cells lost over the primary and secondary paths and also associated error bit rates. If the cell losses over the primary path far exceed the cell losses over the secondary path, or there are substantially higher error bit rates associated with primary path then with the secondary path, a protection switch may be initiated.

In order to use the performance monitoring OAM cells, the nodes must perform real time processing of the aggregate cell stream, at line rates. This adds complexity and cost to the system. Further, the performance monitoring OAM cells do not necessarily provide information from which a node can detect path failure with bursty traffic on a timely basis, since the performance monitoring OAM cells are not generated for a given virtual path when there is no cell traffic on that path.

In the known prior systems, the error information from which the nodes determine path degradation may be thus both delayed and incomplete. Accordingly, the nodes may be delayed in making a determination that a path is degraded and, in turn, in making a decision to perform protection switching. The delayed protection switching decision may result in a loss of cells. What is needed is a mechanism for providing to the nodes, in a timely manner, error information from which the nodes can detect path degradation without significant delay.

SUMMARY OF THE INVENTION

A system employing the inventive rapid ring protection switching sets up corresponding virtual circuits over both the selected ring and the non-selected ring. A destination node maintains a primary set of routing tables that contains the routing information for every virtual circuit over the primary ring. The node also maintains a secondary set of routing tables that contains the routing information for every virtual circuit over the secondary ring. The node then essentially disables the appropriate entries in the routing tables for the non-selected route, such that traffic received over that route is ultimately discarded. The corresponding entries in the routing table for the selected route remain enabled, and the node uses the information contained therein to route the traffic off of the ring.

More specifically, each set of routing tables includes a virtual path index (VPI) table and an associated virtual circuit index (VCI) table. Each entry in the primary and secondary VCI tables includes a VCI key, with the same VCI key assigned to all of the virtual circuits included in a given virtual path. Each entry in the primary and secondary VPI tables includes a VPI key that is set to match the associated VCI key or not match the VCI key depending on which ring is the selected route for a given virtual path. If the primary ring is the selected route for the given vertical path, the VPI key in the primary VPI table entry for the virtual path is set to the same value as the VCI key. The VPI key in the corresponding entry in the secondary VPI table is set to a value that does not match the corresponding VCI key, to disable the entry.

When a detection node receives a cell over, for example, the primary ring, the node enters the primary set of tables and retrieves the routing information contained in the locations addressed using VPI and VCI values included in the cell. Before the node uses the routing information, the node determines if the retrieved VPI and VCI keys match. If the keys match, the node uses the routing information. Otherwise, the node discards the cell. Similarly, when the node receives a cell over the secondary ring, the node enters the secondary set of tables and retrieves the routing information contained therein. The node then determines if the retrieved VPI and VCI keys match, and if so uses the routing information.

To switch a virtual path, and thus all of the virtual circuits included therein, from the selected route to the nonselected route, the node alters the VPI keys in the appropriate entries in the primary and the secondary VPI tables. In the example, the node alters the VPI key in the secondary VPI table entry to match the associated VCI key, and alters the VPI key in the corresponding entry in the primary VPI table to no longer match the VCI key. The node then uses the routing information for the previously non-selected route to direct the affected traffic off of the ring. The switching for all of the affected virtual circuits is thus simultaneously accomplished by altering the appropriate VPI keys. This is in contract to the re-configuring of the hundreds or thousands of virtual circuits, as is required in known prior systems.

To detect an event that triggers protection switching, such as path failure, the system 10 uses "Continuity OAM cells" to provide path status information to the nodes. A source node periodically originates Continuity OAM cells on the primary and the secondary routes to a given destination node. A node that receives a Continuity OAM cell multicasts the cell to (a) the processor on the node and (b) successive nodes on the same ring, without alteration. Accordingly, the Continuity OAM cells travel around each of the rings at predetermined intervals.

If the node processor determines that the node has not received a predetermined number of Continuity OAM cells from a given source node over the selected route within a predetermined time window, the node determines that there is a path failure on the selected route. The affected destination node then triggers protection switching if, in the same window, the node receives an appropriate number of Continuity OAM cells from the source node over the non-selected route. The delay in deciding to trigger protection switching is thus the length of the time window, regardless of the bursty nature of the traffic on the route.

To facilitate detection of path degradation, each source node may include an error count for the associated ring interface in the Continuity OAM cells. The source node thus includes in the Continuity OAM cells that it sends, for example, over the primary ring, an error count associated with its incoming interface on the primary ring. Similarly, the source node includes in the Continuity OAM cells that it sends over the secondary ring an error count associated with the incoming interface on the secondary ring. Each successive node keeps track of the error counts from each of the other nodes and, based on ring topology information, determines accumulated error rates for the routes over the primary and the secondary rings. A destination node detects path degradation when the accumulated error rate over the selected route from the source node exceeds a predetermined maximum rate for a selected time interval. The destination node triggers protection switching if during the same time interval the accumulated error rate over the non-selected route is better than that over the selected route by a predetermined margin.

The continuity OAM cells used in the current system differ from the periodically transmitted OAM cells used in conventional ATM systems to ensure that a connection does not time-out and disconnect because of a lack of traffic. For example, the conventional OAM cells, which are discussed in ITU-T1.610 (3/93) B-ISDN Operations and Principles, do not provide status information about selected and non-selected routes. Further, these OAM cells are not transmitted when there is traffic over the connection.

The current rapid ring protection system, with its mechanism for detecting path failure and/or path degradation, allows the destination nodes to trigger protection switching without the delay incurred in known prior systems. The current switching mechanism then allows the nodes to switch selected and non-selected routes simultaneously for any number of virtual circuits, and ensures that protection switching time limits are met.

BRIEF DESCRIPTION OF THE DRAWINGS

The invention description below refers to the accompanying drawings, of which.

DETAILED DESCRIPTION OF AN ILLUSTRATIVE EMBODIMENT

Figure 1:
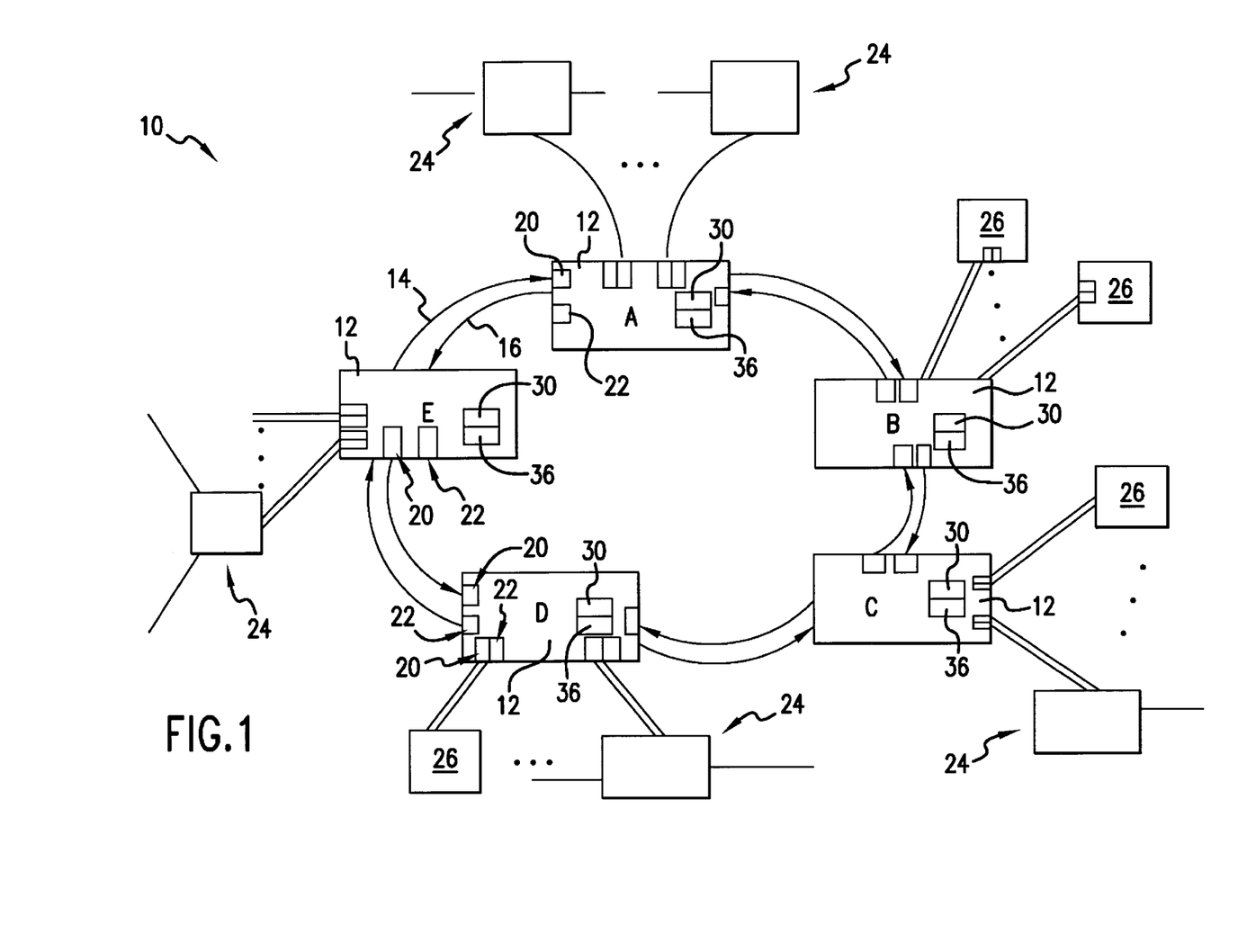
FIG. 1 is a functional block diagram of a system constructed in accordance with the invention.

Referring now to FIG. 1, a system 10 that may be part of an ATM network includes a plurality of nodes 12 that are interconnected by a primary ring 14 and a secondary ring 16. The system 10 may, for example, be a unidirectional SONET ring, with information in the form of ATM cells and frames transmitted in both directions over the primary and secondary rings.

Each node 12 receives information over the rings 14 and 16 through incoming ports 20 and sends information over the rings through destination ports 22. The nodes 12 also connect to other systems 24, including other networks or rings, or to various user terminals 26, through other incoming and destination ports 20 and 22. For ease of explanation, we refer to the nodes generally by the reference numeral 12 and individually by identifying letters, for example, node A, B, C . . .

The ATM cells are sent over the ring from source nodes to destination nodes in virtual circuits. The system groups the virtual circuits into virtual paths that include other virtual circuits with the same source and destination nodes. Unlike the prior known systems, the nodes on the ring 10 dynamically allocate bandwidth to the virtual circuits, and thus, to the virtual paths in which the virtual circuits are included. Accordingly, a given virtual path may include any number of virtual circuits.

Each virtual path is identified by a virtual path index (VPI), and each virtual circuit is similarly identified by a virtual circuit index (VCI). The VPI and VCI values are included in ATM cell headers, and are used by successive nodes to determine how to route the cells.

Intermediate nodes manage the cells on a virtual path basis, without reference to virtual circuit routing information. When an intermediate node receives cells over a virtual path on the primary ring, the node forwards the cells to succeeding nodes on the primary ring over the same virtual path. Similarly, when an intermediate node receives cells over a virtual path on the secondary ring the node forwards the cells to succeeding nodes on the secondary ring over the same virtual path.

The destination node maintains routing information for every virtual circuit over both the primary and secondary rings in primary and secondary sets of routing tables 30 and 36, as discussed in more detail below with reference to FIG. 2. The destination node selects one of the rings 14 or 16 as the selected route for a given virtual path and uses the information from the corresponding set of tables to direct the traffic off of the ring. The node also discards the corresponding traffic received over the non-selected ring.

As discussed below, the system 10 uses a novel protection switching mechanism to simultaneously switch all of the virtual circuits in an affected virtual path. Accordingly, the system 10 can manage any size of virtual path, without violating the protection switching time limit. The system also uses a novel detection mechanism for detecting, without significant delay, the path failures and path degradation that trigger protection switching events. We discuss first the protection switching mechanism, and then the detection mechanism.

A. The Protection Switching Mechanism

The system 10 sets up virtual circuits over both the primary ring and the secondary ring 16, that is, over both the selected and the non-selected routes. As discussed in more detail below, protection switching is performed by selecting to use the set-up virtual circuits on, for example, the secondary ring, instead of the set-up virtual circuits on the primary ring. This is in contrast to prior known systems that set up the virtual circuits over only one route, namely, the selected route, and must then tear down the virtual circuits over the selected route and set up new ones over the non-selected route to perform the protection switch.

Figure 2:
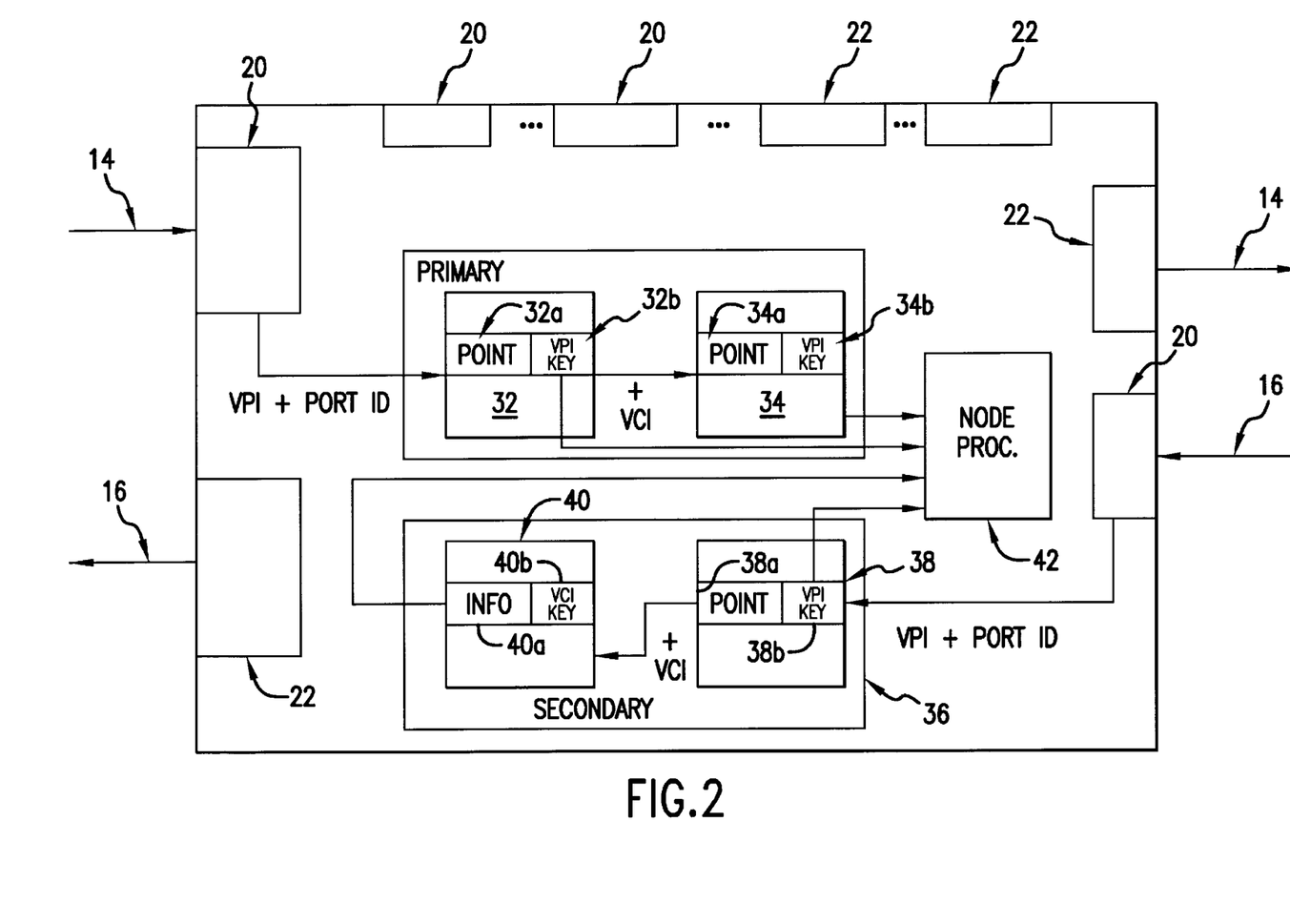
FIG. 2 is a functional block diagram of node on the system of FIG. 1.

Referring now also to FIG. 2, each destination node 12 maintains a set 30 of primary VPI and VCI routing tables 32 and 34 that contain information for routing the cells over every virtual circuit on the primary ring 14, and a set 36 of secondary VPI and VCI routing tables 38 and 40 that contain information for routing the cells over every virtual circuit on the secondary ring. As discussed in more detail below, at any given time the destination node routes cells using the information in the set of tables 30 or 36 that corresponds to the selected route for the associated virtual path.

Each entry in the primary VPI table 32 contains both a pointer 32a to a base location in the primary VCI table and a VPI key 32b. Each entry in the primary VCI table 34 contains both routing information 34a and a VCI key 34b. All of the virtual circuits, or at least all of the virtual circuits in a given virtual path, are assigned the same VCI key 34b. If the primary ring is the selected route for the virtual path, the VPI key in the primary VPI table entry for that virtual path is set to the same value as the associated VCI key 34b. If the primary ring is the non-selected route, the VPI key is instead set to a value that does not match the VCI key. The corresponding entry in the secondary VPI table 38 similarly contains a VPI key 38b that matches the associated VCI key 40b if the secondary ring is the selected route for the given virtual path. If the secondary ring is the non-selected route, the VPI key does not match the VCI key.

When the destination node receives a cell over the selected route, which in the example is the primary ring, the destination node enters the primary VPI table 32 using the VPI value in the cell header and a port identifier that is associated with the incoming port 20 through which the cell was received. As discussed, the addressed table location contains a pointer 32a to a base location in the primary VCI table 34 and a VPI key 32b that matches the VCI key 34b assigned to the associated virtual circuits. The node then enters the location in the primary VCI 34 table that is offset from the base by the VCI value contained in the cell. The addressed location in the VCI table contains the assigned VCI key 34b and information 34a for routing the cell, such as an identifier for the appropriate destination port and a pointer to a memory location in a node processor 42 that contains a replacement header for the cell. The node processor 42 then checks that the retrieved VPI and VCI keys match, before processing the cell in accordance with the routing information retrieved from the primary VCI table 34.

When the destination node 12 receives the same cell over the corresponding virtual path on the secondary, or non-selected, ring 16, the node enters the secondary VPI table 38 using the VPI value in the cell and the port identifier of the associated incoming port 20. The addressed table location contains a pointer 38a to a base location in the associated secondary VCI table 40 and a VPI key 38b that has been set to a value that does not match the associated VCI key 40b. The node then enters the secondary VCI table 40 and retrieves the routing information 40a and the VCI key 40b from the location that is offset from the base by the VCI value included in the cell. The node processor 42 next checks if the retrieved VPI and VCI keys 38b and 40b match and discards the cell, after determining that the keys do not match.

When a segment of the selected route, in the example, the primary ring 14, fails or becomes sufficiently degraded, an affected destination node 12 initiates a protection switch. The destination node thus selects the secondary ring 16 as the route for the affected virtual paths. To implement the switch, the node alters the VPI keys 32b and 38b in the respective entries for the affected virtual paths in both the primary and the secondary VPI tables 32 and 38. The VPI keys 38b in the entries of the secondary VPI table 38 are altered to match the VCI key or keys 40b assigned to the associated virtual circuits, while the VPI keys 32b in the corresponding entries in the primary VPI table 32 are altered to no longer match the assigned VCI key or keys 34b. The routing information in the secondary set of tables 36 is thus simultaneously enabled for all of the virtual circuits in the affected virtual paths, while the corresponding routing information is simultaneously disabled in the primary set of tables 30, and the protection switching is complete.

The protection switching in the system 10 can be performed simultaneously for all of virtual circuits in a virtual path, regardless of number, by altering one entry per affected virtual path in each of two VPI routing tables. This is in contrast to known prior systems that implement protection switching by individually tearing down each affected virtual circuit from the selected route and setting up new virtual circuits on the previously non-selected route.

A single VCI table may be used in systems that use a centralized VPI/VCI translation mechanism. The VPI keys in appropriate entries in the primary and secondary VPI tables are set, as discussed above, to match or not match the VCI keys in the corresponding entries in the single VCI table.

If the system is not unidirectional, two sets of tables are also maintained in the source nodes. Protection switching at the source nodes is then accomplished simultaneously for all of the virtual circuits on the switched virtual paths by altering the appropriate entries in the source node's primary and secondary VPI tables, as discussed above with reference to the destination nodes. The nodes 12 are typically both source and destination nodes, and thus, as appropriate, maintain source and destination primary and secondary set of tables.

In the current system, parallel entries are made in the primary and secondary VPI and VCI tables each time a virtual circuit is set up. Each destination node in the current system must thus store essentially twice as much routing information as the nodes of the known prior systems. Accordingly, the nodes in the current system are more complex than the nodes in the prior known systems. However, the current system trades-off the increase in node complexity with an ability to implement protection switching in far less time than the known prior systems. This allows the current system to include any number of virtual circuits in a given virtual path, without adversely affecting the time the system takes to perform protection switching. Accordingly, the system can accommodate dynamic allocation of bandwidth to the virtual circuits, and thus, the inclusion of essentially any number of virtual circuits in a given virtual path.

A. The Detection Mechanism

Figure 3:
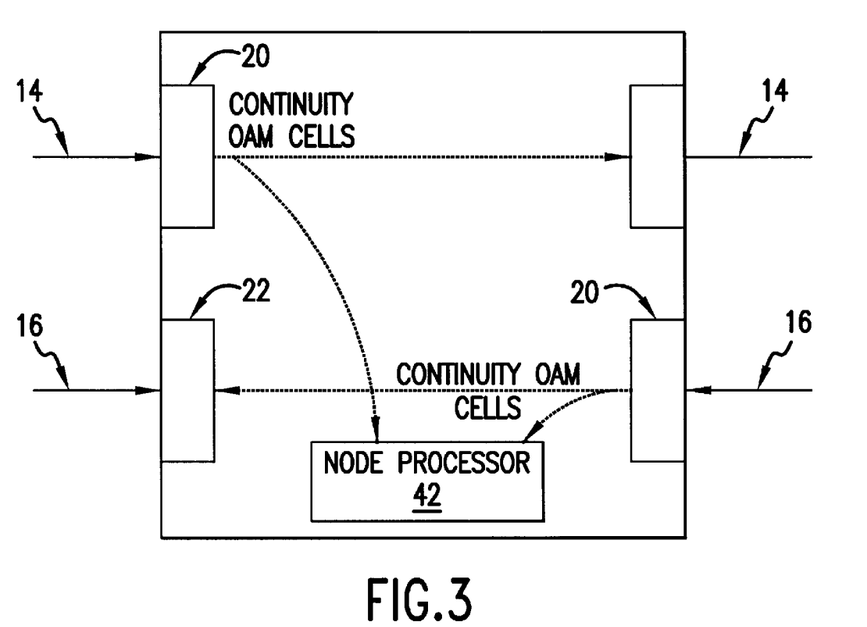
FIG. 3 is a functional diagram of the path failure and/or degradation detection system in the node of FIG. 2.
Figure 4:
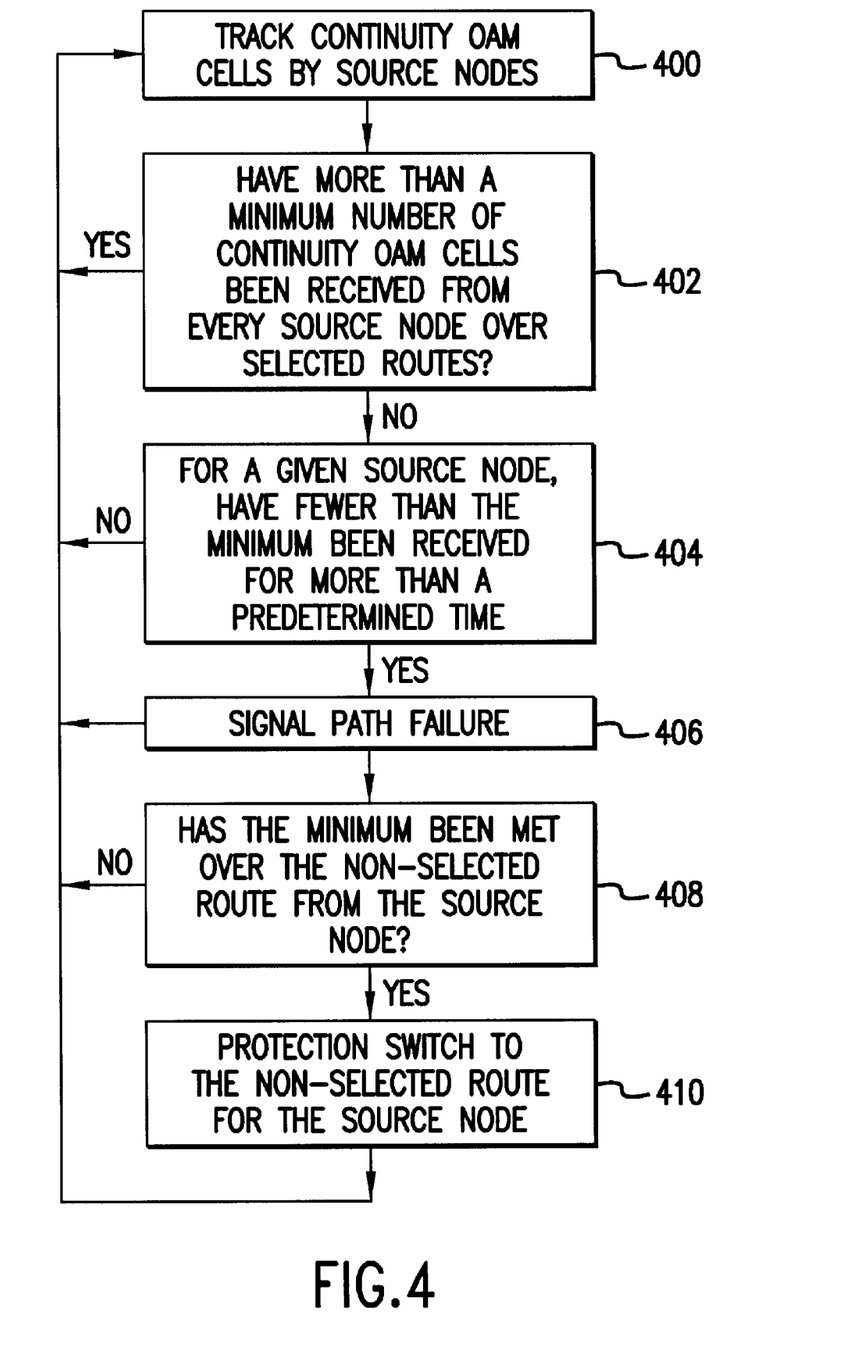
FIG. 4 is a flow chart of the path failure detection operations.

Referring now also to FIGS. 3 and 4, each source node 12 periodically originates "Continuity OAM cells" and sends them over both the primary and secondary rings 14 and 16, preferably over a dedicated virtual path. The source node may, for example, send the Continuity OAM cells over the rings every 10 msec. When a node receives a Continuity OAM cell, the node multicasts the cell to its local node processor 42 for processing, and, without alteration, along the same ring to successive nodes 12. The Continuity OAM cells thus travel around the system 10 in both directions at predetermined intervals.

The node processor 42 keeps track of the number of Continuity OAM cells received from each of the source nodes over prescribed time periods, or windows, to determine if the paths to the node over the primary and secondary rings are in working order (step 400). Each destination node determines if it should initiate protection switching based on the number of Continuity OAM cells received from the source node over both the selected and the non-selected routes.

The destination node detects a path failure in the selected route from a given source node if, in a given time window, the destination node receives from the source node fewer than a predetermined minimum number of the Continuity OAM cells (steps 402, 404). The destination node then triggers protection switching if, in the same time window, the node receives an appropriate number of Continuity OAM cells from the source node over the non-selected route (steps 408, 410). The destination node then alters the VPI keys in the primary and secondary VPI table entries for all of the virtual paths that originate at the affected source node, using ring topology information gained by periodic ring discovery. Preferably, the destination node also informs a system manager of the detected path failure, even if the node does not perform protection switching (step 406).

Instead of using a dedicated virtual path, the source node may instead send the Continuity OAM cells over dedicated virtual circuits in one or more of its virtual paths. If the Continuity OAM cells are included in a dedicated virtual circuit in each of the virtual paths, the destination node need not consult its ring topology information to determine which virtual paths to switch.

The system 10 may require valid VCI table entries to route the Continuity OAM cells to the node processors. If so, the destination nodes must ensure that the VPI and VCI keys for the dedicated virtual paths or virtual circuits match in both sets of routing tables. The destination node sets the VPI key in the table for the selected route to match the VCI key assigned to all of the virtual circuits in the virtual path, including the dedicated virtual circuit. In the tables for the non-selected route, the node sets the VCI key associated with the dedicated virtual circuit to match the VPI key, which has been altered to a value that does not match the VCI key assigned to the remaining virtual circuits in the virtual path. The Continuity OAM cells received over the dedicated virtual circuit on the non-selected route are then directed to the node processor 42, while the cells that are received over the remaining virtual circuits are discarded.

The Continuity OAM cells may be removed from the rings by the destination node, since the cells do not provide continuity information to the remaining nodes. Alternatively, the Continuity OAM cells may be removed from the ring by the source nodes, particularly if the Continuity OAM cells are used, as discussed below, to provide path degeneration information to the nodes.

As previously discussed, information concerning errors in the cells, which are commonly referred to as bit interleave parity (BIP) errors, is not readily available to the destination nodes. To provide the error information to the destination nodes, the system 10 may alter the Continuity OAM cells to include therein a count of the BIP errors associated with the appropriate interface of the source node. For example, the source node includes in a Continuity OAM cell sent over the primary ring the BIP error count associated with the primary ring incoming interface. Each successive node on the primary ring then keeps track of the BIP error counts by source node over the predetermined time intervals used to detect path failure. The nodes similarly keep track of the BIP error counts for all of the source nodes on the secondary ring, based on the Continuity OAM cells on that ring.

Figure 5:
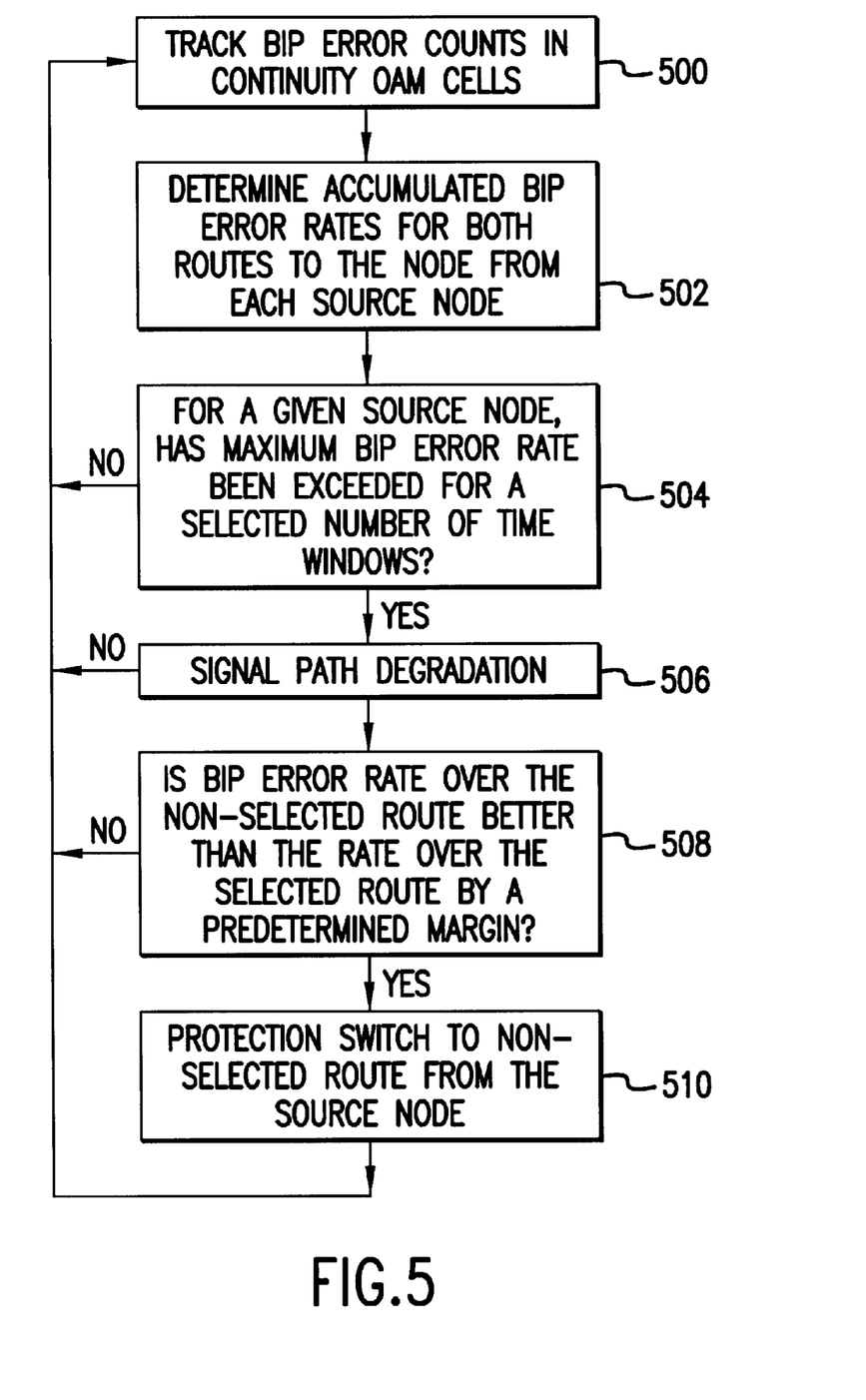
FIG. 5 is a flow chart of the path degradation detection operations.

Referring now also to FIG. 5, the destination node determines accumulated BIP error rates for the routes over both the primary and secondary rings from every source node by adding together the BIP error counts associated with the appropriate interfaces on each of the nodes in the routes (steps 500, 502). The destination node then determines that a selected path has degraded if the accumulated BIP error rate for a given route exceeds a predetermined maximum over a selected number of time windows. The destination node triggers a protection switching event if, during the same time period, the accumulated BIP error rate over the non-selected route is better than that over the selected route by more than a predetermined margin (steps 508, 510). For example, the node triggers a protection switching event if the accumulated BIP error rate reaches $10^{-5}$ over the selected route and is $10_{-6}$, or ten times better, over the non-selected route. Preferably, the node also notifies the system manager of the path degradation (step 506).

Figure 6:
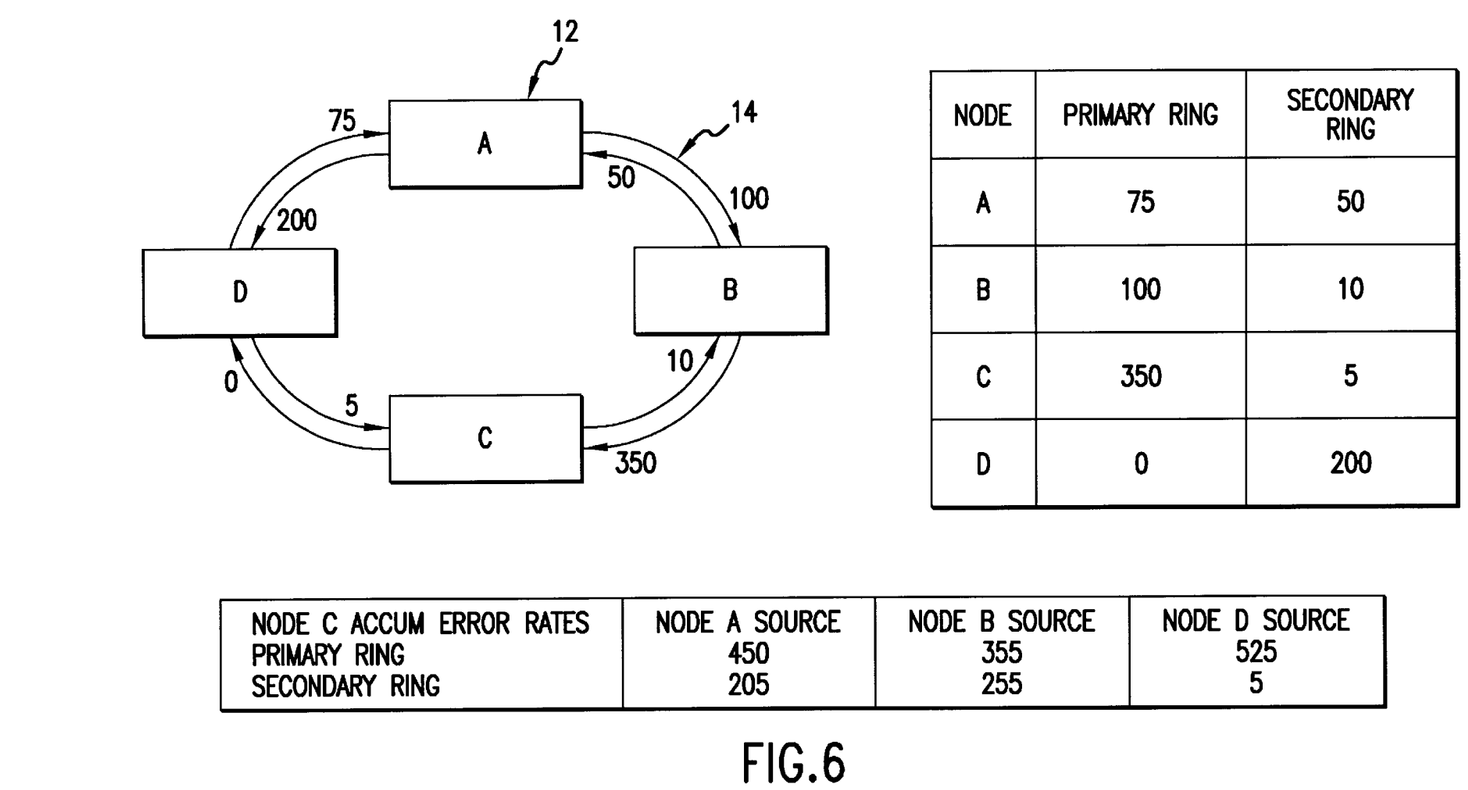
FIG. 6 is a further diagram of the path degradation system of FIGS. 3 and 5.

Referring now also to FIG. 6 the BIP error counts at the primary ring incoming interfaces and the secondary ring incoming interfaces are depicted at each node. When node A sends a Continuity OAM cell over the primary ring 14 it includes in the cell a BIP error count of 75. When the same node sends a Continuity OAM cell over the secondary ring 16, it includes a BIP error count of 50. Similarly, the Continuity OAM cells from each of the other nodes include the appropriate BIP error counts depicted over the respective rings. The BIP error counts may be included in every Continuity OAM cell, or may be included periodically in selected cells, as appropriate.

Each node records the received BIP error counts in a table 44 and produces an accumulated BIP error rate table 46 based on the ring topology. The accumulated BIP error rate table includes entries for the routes from each of the nodes over both the primary and the secondary rings. For example, node C determines the accumulated BIP error rate for the route over the primary ring from node A by adding together the BIP error counts associated with the primary route interfaces at nodes B and C. The node C similarly determines the accumulated BIP error rate for the route from node A over the secondary ring by adding together the BIP error counts for the secondary interfaces on each of the nodes D and C. The table 46 in the drawing depicts the accumulated error rates for the node C.

The node C determines if a protection switch should occur for virtual paths from a given node based on the associated primary ring and secondary ring accumulated BIP error rates. The node first determines if the accumulated error rate for the selected route is above a predetermined maximum error rate. If so, the node next determines if the accumulated BIP error rate for the non-selected route is better than that for the selected route by at least the predetermine margin. If so, node C performs a protection switch. Otherwise, the node continues to use the selected route. Based on the information in table 46, the node C implements protection switching only for the virtual paths that originate at node D.

The foregoing description has been limited to a specific embodiment of this invention. It will be apparent, however, that variations and modifications may be made to the invention, such as, the inclusion of the primary and secondary routing tables in the node processor, the use of any type of specialized cell to provide route status information to the nodes including, for example, a performance monitoring OAM cell that is modified to include a BIP error count and is transmitted even during periods with no cell traffic or a combination of modified performance monitoring OAM cells and modified conventional continuity OAM cells that are modified to include BIP error counts, and/or the use of the simultaneous virtual path protection switching with or without the path failure and/or degradation mechanisms in a SONET ring or in any network with predefined primary and secondary routes, with the attainment of some or all of its advantages. Therefore, it is the object of the appended claims to cover all such variations and modifications as come within the true spirit and scope of the invention.

What is claimed is:

1. A protection switching system for use with a network with a primary route and a secondary route, the system including:

A. a primary set of routing tables containing information for routing traffic over the primary route for every virtual circuit;

B. a secondary set of routing tables containing information for routing traffic over the secondary route for every virtual circuit; and C. route selection means for selectively disabling entries for virtual circuits in the set of routing tables that corresponds to the current non-selected route for the virtual circuits and selectively enabling the entries in the set of tables that corresponds to the current selected route for the virtual circuits.

2. The protection system of claim 1 wherein
  a. the primary set of routing tables includes a primary VPI table that has a VPI key in each entry and a primary VCI table that has a VCI key in each entry;
  b. the secondary set of routing tables includes a secondary VPI table that has a VPI key in each entry and a secondary VCI table that has a VCI key in each entry; and
  c. the route selection means switching routes for all virtual circuits included in a given virtual path by altering the VPI keys from matching the associated VCI key to not matching the VCI key for the VPI entry in the VPI table for the previously selected route and altering the VPI key from not matching to matching the associated VCI key in the corresponding entry in the VPI table for the previously non-selected route.

3. A method of protection switching for systems with predetermined primary and secondary routes, the method including the steps of:
  A. setting up virtual circuits and corresponding virtual paths over the primary route and maintaining a primary set of routing tables;
  B. setting up virtual circuits and corresponding virtual paths over the secondary route and maintaining a secondary set of routing tables; and
  C. selecting a route for the virtual circuits included in a given virtual path by enabling an entry for the virtual path in the associated set of routing tables and disabling an entry for the virtual path in the set of routing tables that are not associated with the selected route.

4. The method of claim 3 wherein
  a. the step of maintaining a primary set of routing tables includes maintaining primary route VPI and VCI tables, with each entry in the primary route VPI table including a VPI key and each entry in the primary route VCI table including a VCI key;
  b. the step of maintaining a secondary set of routing tables includes maintaining secondary route VPI and VCI tables, with each entry in the secondary route VPI table including a VPI key and each entry in the secondary route VCI table including a VCI key; and
  c. the step of selecting routes includes altering the VPI keys in the corresponding entries in the primary route and secondary route VPI tables, such that the VPI key in the entry for the selected route matches the VCI key in the associated entry in the associated VCI table and the VPI key in the entry for the non-selected route does not match the VCI key in the associated entry in the associated VCI table.

5. A method of detecting path failure in a system with predefined primary and secondary routes including the steps of:
  A. periodically sending specialized continuity cells over the primary and secondary routes from each source node;
  B. receiving the specialized continuity cells at each node and multicasting the specialized continuity cells to successive nodes on the routes and to a local node processor;
  C. determining at each node the number of specialized continuity cells received from a given source node during predetermined time windows over each of the primary and secondary routes; and
  D. determining a path failure if a node receives fewer than a predetermined minimum number of specialized continuity cells within a selected number of the time windows over a given route.

6. The method of claim 5 further including the steps of:
  E. determining if the path from a given source node over a selected one of the primary route or the secondary route has failed;
  F. if the path over the selected route has failed, determining if the path over the non-selected route has failed; and
  G. if the path over the non-selected route has not failed, triggering protection switching for traffic that originates from the source node.

7. The method of claim 6 further including the step of performing protection switching by selecting to use set-up virtual circuits on the previously non-selected route and refraining from using corresponding set-up virtual circuits on the previously selected route.

8. The method of claim 6 further including the steps of:
  H. including in the specialized continuity cells from each source node a BIP error count for an incoming interface for the associated route;
  I. for routes from a given source node determining accumulated BIP error rates based on the BIP error counts in the specialized continuity cells received from the nodes on the routes;
  J. determining a path has degraded if at a destination node the accumulated BIP error rate for the associated route exceeds a predetermined maximum for a selected number of time windows.

9. The method of claim 8 further including triggering protection switching for traffic that originates from the source node if the accumulated BIP error rate for the selected route exceeds the predetermined maximum and the accumulated BIP error rate for the non-selected route is lower by a predetermined margin.

10. The method of claim 9 further including the step of performing protection switching by selecting to use set-up virtual circuits on the previously non-selected route and refraining from using corresponding set-up virtual circuits on the previously selected route.

11. A method of detecting path degradation in a system with predefined primary and secondary routes including the steps of:
  A. periodically sending specialized cells with error counts over the primary and secondary routes from each source node;
  B. receiving the specialized cells at each node and multicasting the specialized cells to successive nodes on the routes and to a local node processor;
  C. determining, at each node for each route from a given source node, accumulated error rates based on the error counts in the specialized cells received from the nodes on the routes;
  D. determining a path has degraded if at a destination node the accumulated error rate for the associated route exceeds a predetermined maximum for a selected number of time windows.

12. The method of claim 11 further including triggering protection switching for traffic that originates from the source node if the accumulated BIP error rate for the selected route exceeds the predetermined maximum and the accumulated BIP error rate for the non-selected route is lower by a predetermined margin.

13. The method of claim 12 further including the step of performing protection switching by selecting to use set-up virtual circuits on the previously non-selected route and refraining from using corresponding set-up virtual circuits on the previously selected route.

* * * * *